US012667743B2

(12) United States Patent
Krutskevych et al.

(10) Patent No.: US 12,667,743 B2
(45) Date of Patent: Jun. 30, 2026

(54) FIRE SUPPRESSION BULB DEVICE

(71) Applicant: Marioff Corporation Oy, Vantaa (FI)

(72) Inventors: Nazar Krutskevych, Gdańsk (PL); Piotr Wolnowski, Gdańsk (PL); Sebastian Świerzewski, Gdańsk (PL)

(73) Assignee: MARIOFF CORPORATION OY, Vantaa (FI)

( * ) Notice: Subject to any disclaimer, the term of this patent is extended or adjusted under 35 U.S.C. 154(b) by 839 days.

(21) Appl. No.: 17/738,386

(22) Filed: May 6, 2022

(65) Prior Publication Data

US 2022/0355146 A1 Nov. 10, 2022

(30) Foreign Application Priority Data

May 7, 2021 (EP) ..................................... 21172817

(51) Int. Cl.
*A62C 37/14* (2006.01)
*A62C 37/50* (2006.01)

(52) U.S. Cl.
CPC .............. *A62C 37/14* (2013.01); *A62C 37/50* (2013.01)

(58) Field of Classification Search
CPC ................................ A62C 37/14; A62C 37/50
USPC ............................................................ 169/37
See application file for complete search history.

(56) References Cited

U.S. PATENT DOCUMENTS

| | | | | |
|---|---|---|---|---|
| 6,615,927 | B1 | 9/2003 | Kim | |
| 6,734,795 | B2 | 5/2004 | Price | |
| 8,237,572 | B2 | 8/2012 | Clement et al. | |
| 9,928,457 | B2 * | 3/2018 | McDowell | G06K 19/041 |
| 9,978,553 | B2 * | 5/2018 | Tomimbang | H02H 1/0015 |
| 9,978,580 | B2 | 5/2018 | Johnson et al. | |
| 11,364,400 | B2 * | 6/2022 | Krutskevych | A62C 37/11 |
| 2004/0194976 | A1 * | 10/2004 | Kretzschmar | A62C 37/14 169/42 |
| 2007/0215362 | A1 | 9/2007 | Rodgers | |
| 2008/0007473 | A1 * | 1/2008 | Yosui | H01Q 7/08 343/788 |
| 2019/0366020 | A1 * | 12/2019 | Tritschler | G08B 21/24 |
| 2020/0039106 | A1 | 2/2020 | Kukkonen et al. | |
| 2020/0276464 | A1 * | 9/2020 | Krutskevych | A62C 37/50 |
| 2020/0391064 | A1 * | 12/2020 | Sadek | A62C 37/50 |
| 2022/0241632 | A1 | 8/2022 | Swierzewski et al. | |
| 2022/0266078 | A1 * | 8/2022 | Pena | A62C 37/14 |

FOREIGN PATENT DOCUMENTS

| | | | | |
|---|---|---|---|---|
| CN | 201489564 U | | 5/2010 | |
| EP | 2347432 B1 | | 7/2013 | |
| EP | 2800926 B1 | | 5/2017 | |
| EP | 3597274 A1 | * | 1/2020 | A62C 31/28 |

(Continued)

OTHER PUBLICATIONS

European Search Report for Application No. 21172817.5; Issued Oct. 29, 2021; 8 Pages.

*Primary Examiner* — Cody J Lieuwen
(74) *Attorney, Agent, or Firm* — CANTOR COLBURN LLP

(57) ABSTRACT

A bulb device 100 for a sprinkler device 200 of a fire suppression system, and a method of manufacturing a bulb device 100. The bulb device 100 includes a sprinkler bulb 101; a wireless communication device 120; and a coupling 150 affixing the wireless communication device 120 to an external surface of the sprinkler bulb 101.

12 Claims, 3 Drawing Sheets

(56) References Cited

FOREIGN PATENT DOCUMENTS

| | | | | | |
|---|---|---|---|---|---|
| EP | 3623019 | A1 | | 3/2020 | |
| EP | 3643366 | A1 | | 4/2020 | |
| EP | 3662976 | A1 | | 10/2020 | |
| GB | 2563815 | A | * | 1/2019 | ............. A62C 13/76 |
| JP | 2008027416 | A | | 2/2008 | |
| KR | 20150111891 | A | | 10/2015 | |
| WO | 2020018261 | A1 | | 1/2020 | |
| WO | 2021009622 | A1 | | 1/2021 | |

* cited by examiner

FIRE SUPPRESSION BULB DEVICE

FOREIGN PRIORITY

This application claims priority to European Patent Application No. 21172817.5, filed May 7, 2021, and all the benefits accruing therefrom under 35 U.S.C. § 119, the contents of which in its entirety are herein incorporated by reference.

TECHNICAL FIELD OF INVENTION

The invention relates to a bulb device, a fire suppression system comprising a bulb device, and a method of manufacturing a bulb device.

BACKGROUND OF THE INVENTION

Fire suppression systems typically include sprinkler devices arranged to expel or disperse fluid for suppressing or preventing fire. Sprinkler devices typically include sprinkler bulbs which are arranged to break at predetermined temperatures indicative of a fire (or indicative of a risk of fire), and thereby cause the sprinkler device to emit fire suppression fluid. Sprinkler bulbs therefore operate as a type of mechanical fuse, which release fire suppression fluid from an associated source when they break. In order to function correctly, the bulb of the sprinkler device must reliably break under prearranged circumstances which occur in the event of a fire.

Some fire suppression systems employ sprinkler bulbs that communicate wirelessly with the system. The systems can then obtain limited information from those bulbs, such as whether a sprinkler device with which the bulb is associated has been activated or not. Since sprinkler bulbs are typically small, frangible, single-use components of the fire suppression system, their adaptation faces certain practical limitations of economy and suitability to the system in which they are used. Moreover, the basic functionality of many fire suppression systems is difficult to change, since they are often already installed on site. Improvements to fire suppression systems employing sprinkler bulbs using wireless communication are therefore needed.

SUMMARY OF THE INVENTION

According to a first aspect of the present invention there is provided a bulb device for a sprinkler device of a fire suppression system, the bulb device comprising: a sprinkler bulb; a wireless communication device; and a coupling affixing the wireless communication device to an external surface of the sprinkler bulb.

The wireless communication device is therefore external to the sprinkler bulb and as such may not be subject to high pressures, stresses, or the like resulting from normal operation of the sprinkler bulb. For example, the wireless communication device may not be exposed to stresses and/or strains from deformation of a housing of the sprinkler bulb. The wireless communication device may be entirely outside the sprinkler bulb i.e. the wireless communication device may be arranged so that no part is within the sprinkler bulb (e.g. within a housing or inner volume of the sprinkler bulb). The wireless communication device may occupy a separate and distinct volume to the sprinkler bulb. The wireless communication device therefore may not be degraded or damaged by operation of the sprinkler bulb (i.e. by fragmentation or explosion of the sprinkler bulb), and hence may be reusable.

Sprinkler bulbs are inherently single use components of a fire suppression system, and as such they are designed to be expendable. Any electronic components of known sprinkler bulbs are embedded or sealed within the sprinkler bulb itself, and hence can be damaged by activation (i.e. breakage) of the sprinkler bulb e.g. during a detection event. In contrast, the wireless communication device of the present disclosure is removed from the interior of the sprinkler bulb and occupies a different volume in space. Hence, it may not be damaged by the high pressures or temperature within the sprinkler bulb.

The sprinkler bulb may comprise a sealed frangible housing. The sealed, frangible housing of the sprinkler bulb may contain a fluid. The sprinkler bulb may be configured so that the housing breaks when the fluid reaches a predetermined temperature, or when it is subject to a predetermined pressure from the fluid. Thus, the sprinkler bulb may be suitable for use in a conventional sprinkler device and/or fire suppression system or the like. The bulb device may be operable as a conventional sprinkler bulb. The sprinkler bulb may be arranged so that the housing cracks, bursts, shatters or otherwise breaks under predetermined conditions, for example predetermined conditions indicative of a fire event (e.g. when subject to a predetermined temperature), so that the sprinkler bulb may be used for activating a sprinkler device and/or a fire suppression system when the predetermined conditions are met. The sprinkler bulb may be suitable for preventing release of a fire suppressant or the like from a sprinkler device unless it breaks. For example, the sprinkler bulb may be configured to break, shatter or burst, when its temperature reaches a predetermined threshold. The sprinkler bulb may be arranged so that when it is intact it may support a predetermined mechanical load, e.g. for holding a seal or plug of a sprinkler device in place to prevent release of fire suppressant.

The coupling may be provided on an external surface of the frangible housing of the sprinkler bulb. The wireless communication device may therefore be insulated from conditions within the sprinkler bulb, and hence may not be exposed to the high temperatures and/or high pressures required for normal operation of the sprinkler bulb. The wireless communication device therefore may not be disposed within the fluid of the sprinkler bulb. The wireless communication device therefore may not be damaged by operation of the sprinkler bulb e.g. by the high pressures needed to cause the sprinkler bulb to break. The wireless communication device may therefore be re-usable, and may therefore be manufactured to a higher standard than e.g. a single-use wireless communication device.

The coupling may be formed of a different material to the housing of the sprinkler bulb. The housing of the sprinkler bulb may be formed of any suitable material, and may comprise or be formed of glass, plastic, crystal, ceramic, quartzoid, or the like. The housing may be formed entirely of glass, plastic, crystal, ceramic, quartzoid, or the like.

The coupling may reinforce the sprinkler bulb adjacent the wireless communication device. The coupling may be any suitable fixing and may be substantially rigid in use. The coupling may be secure enough to ensure reliable mounting of the wireless communication device to the sprinkler bulb. The coupling may be disposed between the wireless communication device and the sprinkler bulb. The coupling may prevent deterioration or breakage of the portion of the sprinkler bulb (e.g. a portion of the housing) that carries the wireless communication device. The coupling may therefore be disposed to shield the wireless communication device from the sprinkler bulb, so that in the event that the sprinkler bulb breaks (e.g. explodes) during activation, the coupling shields the wireless communication device. The coupling device may be arranged to withstand forces from the sprinkler bulb during activation (i.e. breakage) of the sprinkler bulb. As such, the coupling may further reduce the risk of damage to the wireless communication device.

The sprinkler bulb may only contain fluid. The housing of the sprinkler bulb may only contain fluid therein. The sprinkler bulb may be a conventional sprinkler bulb and may not comprise any electronic device, wire, heating element, sensor, antenna, or the like, embedded and/or enclosed therein. Thus, the wireless communication device may be the only electronic component of the bulb device.

The wireless communication device may comprise an RFID tag. The wireless communication device may be an RFID tag. The wireless communication device may be a passive device. The wireless communication device may be responsive to a signal from a remote antenna (e.g. an antenna of a sprinkler device as discussed below).

The coupling may be any suitable connection to affix the wireless communication device to the sprinkler bulb. The coupling may comprise a resin cured by ultra-violet light (i.e. a substance curable by ultra-violet light). The coupling may comprise adhesive, glue, glass, epoxy, cement, resin, or any suitable composition.

The sprinkler bulb may be operable to break by being heated e.g. by a nearby fire. Typical sprinkler bulbs are often configured to activate at industry standard temperature ratings, and may be colour coded to indicate their temperature ratings. For example, the following table shows industry standard temperature ratings and corresponding sprinkler bulb colours.

| Temperature Rating | | Colour of Fluid |
| --- | --- | --- |
| Celsius | Fahrenheit | Within Bulb |
| 57 | 135 | Orange |
| 68 | 155 | Red |
| 79 | 174 | Yellow |
| 93 | 200 | Green |
| 141 | 286 | Blue |
| 182 | 360 | Mauve |
| 227/260 | 440/500 | Black |

The sprinkler bulb may be configured according to the industry standards shown above, and may therefore have an industry standard temperature rating i.e. a predetermined temperature at which the housing breaks. The sprinkler bulb may also be coloured in accordance with the industry standards shown above e.g. containing coloured fluid.

The sealed frangible housing may be configured such that the housing will break when pressure within the housing reaches a predetermined threshold. Thus, the size, thickness, characteristics and/or mechanical properties of the housing may be chosen accordingly. The coupling may be arranged so that the sprinkler bulb breaks under predetermined conditions e.g. so that the sprinkler bulb operates according to the industry standards shown above. Thus, the coupling may not effect operation of the sprinkler bulb.

The coupling may be configured to protect the wireless communication device from the sprinkler bulb during activation e.g. during explosion of the sprinkler bulb. Activation of the sprinkler bulb may be forceful enough to cause the sprinkler bulb to explode, and fragments of the sprinkler bulb can therefore be propelled outwards with significant force. The coupling may therefore be arranged to protect the wireless communication device from explosion of the sprinkler bulb, and may comprise a shield against fragments of the sprinkler bulb e.g. against fragments of the housing. The coupling may be thick enough, large enough, and/or durable enough to shield the wireless communication device from the sprinkler bulb during activation.

The bulb device may be configured so that the wireless communication device does not break upon activation of the sprinkler bulb. The wireless communication device may therefore continue to be operable after activation of the sprinkler bulb. The wireless communication device may therefore be located and re-used.

The coupling may be resistant to solvents, corrosion, vibration, radiation, high temperatures and/or impacts. Thus, the coupling may be sufficiently robust that it can be employed reliably in a wide range of environments, and may not deteriorate or fail when exposed to harsh environmental conditions. As such, the wireless communication device may be reliably attached to the sprinkler bulb, and a fire suppression system employing the bulb device may thereby operate reliable.

The bulb device may be arranged to propel the wireless communication device away from the sprinkler bulb upon activation of the sprinkler bulb. The coupling may therefore serve as a platform, carrier, sabot or the like for launching the wireless communication outward, away from the position of the sprinkler bulb during activation. For example, by reinforcing a portion of the sprinkler bulb adjacent the wireless communication device, the coupling may ensure that activation (e.g. explosion) of the sprinkler bulb will propel the wireless communication device away, carried by the coupling. The coupling may be selected so that its size, shape, and/or durability will ensure that it is not broken up by activation (e.g. explosion) of the sprinkler bulb, so that it will carry the wireless communication device away from the location of the activation of the sprinkler bulb.

Thus, once the sprinkler bulb activates (e.g. explodes) the wireless communication device may be propelled (e.g. thrown) a distance from a sprinkler device, thereby ensuring that the sprinkler device will not detect the wireless communication device, and therefore will reliably determine that the sprinkler bulb has been activated. In contrast, wireless communication devices embedded or enclosed within the sprinkler bulb may not be propelled away upon activation of the sprinkler bulb and an associated sprinkler device may continue to detect the wireless communication device and therefore may not detect that the sprinkler bulb has been activated.

The sprinkler bulb may have a diameter of less than about 12 millimetres, less than about 8 millimetres, or less than about 4 millimetres. The sprinkler bulb may have a conventional size and may be any size suitable for a fire suppression system. However, the sprinkler bulb may be relatively small. The sprinkler bulb may have a size according to e.g. the Day-Impex Range of Standard Glass Bulbs, and may be a 826, 817, 933, 937, 984, 941, 942, or 989 bulb type.

According to a second aspect of the present invention there is provided a sprinkler device for a fire suppression system, the sprinkler device comprising: a bulb device as described herein with reference to the first aspect of the invention; an antenna for communicating with the wireless communication device of the bulb device; and a base plate, wherein the antenna is disposed within the base plate.

The sprinkler device may therefore be configured such that during use the wireless communication device may communicate with the antenna in the base plate, and vice versa. The antenna may therefore be operable to receive a signal (e.g. elicit a responsive signal) from the wireless communication device e.g. to confirm the presence of a bulb device in the sprinkler device, and thereby confirm that the sprinkler device is in a ready state. The antenna may be operable to elicit (and subsequently detect) a response from the wireless communication device.

The antenna in the base plate of the sprinkler device may be controlled by a sprinkler device controller, which sprinkler device controller may be part of the sprinkler device, and/or may be part of a fire suppression system. The controller may be connected (e.g. physically, electronically connected) to a fire suppression system. Thus, the sprinkler device may be operable to communicate with the bulb device therein, and during use a fire suppression system connected to (and/or comprising) the controller may communicate wirelessly with the bulb device.

The bulb device may be configured so that the wireless communication device is propelled out of the sprinkler device by activation of the sprinkler bulb. Thus, the location of the wireless communication device on an outer surface of the sprinkler bulb may increase reliable detection of the sprinkler bulb activation by propelling the wireless communication device away from the sprinkler device so that the sprinkler device cannot detect it.

The base plate may be arranged around (and/or provide) an outer perimeter of the sprinkler device. The base plate may be disposed on a surface on which the sprinkler device is installed. For example, if the sprinkler device is installed in a ceiling, the base plate may be provided on the ceiling. The base plate may therefore aid in mounting the sprinkler device to a surface such as a ceiling. Alternatively, the base plate may be decorative and may be provided to cover a part of the surface in which the sprinkler device is located. The base plate may be entirely decorative except for its function of housing the antenna. The base plate may decorate a surface in which the sprinkler device is provided. The antenna may be provided inside the base plate e.g. in an enclosure formed thereby. Alternatively, the antenna may be embedded within the base plate.

The base plate may be disposed between the antenna and the bulb device. The base plate may therefore be interposed between the wireless communication device of the bulb device and the antenna. Thus, signals between the wireless communication device and the antenna may need to travel through at least a portion of the base plate. Communication between the antenna and the wireless communication device of the bulb device may therefore be through the base plate, and the base plate may consequently reduce, attenuate, or interfere with signals between the wireless communication device and the antenna. The positioning of the antenna within the base plate may therefore be a compromise between proximity to the wireless communication device, and functionality in view of a weakened signal.

The base plate may also be arranged to protect the antenna e.g. from extreme conditions like high temperatures resulting from a fire event. The antenna may therefore be safe from damage in the event of fire that might otherwise cause it damage. Therefore, in the event of a fire that causes the sprinkler to activate, only the bulb device may need to be replaced, and antenna may not need to be replaced.

The antenna may be a coil antenna. The antenna may have any suitable shape and may be disposed all about the sprinkler device. That is, the antenna may surround a central axis of the sprinkler device.

The base plate may have a substantially circular shape, and the antenna may therefore be compactly arranged within the base plate. Thus, the strength of the signal output by the antenna may be maximised with respect to the shape of the base plate and the space available for the second antenna. Further, the arrangement recited herein permits existing fire suppression systems to be retrofit with sprinkler devices and bulb devices as described herein e.g. by addition of a base plate, antenna and bulb device to an existing sprinkler device.

The sprinkler bulb of the bulb device may be coaxial with the antenna. For example, the antenna may be a coil antenna and the sprinkler bulb may be arranged coaxially with the coil antenna. The antenna may be located around the sprinkler bulb on all sides, and hence may be around the wireless communication device. The antenna may therefore be arranged so that the sprinkler bulb is located at a position where the strength of the signal from the antenna is strongest. The wireless communication device of the bulb device may be co-axial with the antenna, and hence the wireless communication device (instead of the sprinkler bulb) may be located at a position where the strength of the signal from the antenna is strongest.

The base plate may be formed of metal, heat resistant polymer, glass, and/or composite. Sprinkler devices are typically formed of metal such as stainless steel or other materials which are sufficiently robust and heat resistant to be reliable for use in fire suppression systems. However, such robust materials also typically block or interfere with electromagnetic waves, posing difficulties for wireless communication with a bulb device in the sprinkler device. This may particularly be the case when the sprinkler device is mounted to a surface such as a ceiling so that the bulb device is obscured by a majority (e.g. a body or cage) of the sprinkler device (e.g. from components installed behind the ceiling). Moreover, the bulb device may be relatively small and may output a limited signal strength to be detected by the antenna. Reliable detection of the bulb device by the sprinkler device can therefore be difficult.

The base plate may interfere with wireless communication between the wireless communication device and the antenna. The base plate may attenuate electromagnetic waves passing through it. However, the base plate may be sufficiently close to the bulb device so that the antenna can still reliably communicate with the bulb device despite the base plate. The base plate may therefore be sufficiently robust and protective, despite the resulting impediment to communication between the antenna and wireless communication device of the bulb device, because the provision of the base plate allows the antenna to be large enough, and close enough to the bulb device. The base plate may be made of any suitable material. The base plate may be formed of stainless steel.

The sprinkler device may comprise a flux concentrator arranged to concentrate flux from the second antenna at the bulb device. The flux concentrator may therefore increase the strength of the signal from the antenna at the bulb device, and particularly at the wireless communication device. The flux concentrator may concentrate flux from the wireless communication device of the bulb device at the antenna, thereby increasing the strength of the signal from the wireless communication device at the antenna.

The flux concentrator may be arranged to prevent parasitic loss of the signal from the antenna to other components of the sprinkler device e.g. a housing and/or mount, which may be formed of metal in order to be sufficiently robust and heat-safe in the event of a fire.

The flux concentrator may be disposed on an opposite side of the antenna to the bulb device. The flux concentrator may be configured to reflect electromagnetic signals e.g. from the antenna towards the bulb device and/or from the bulb device towards the antenna. The flux concentrator may be installed within the base plate.

The sprinkler device may comprise a fluid inlet for fire suppression fluid, and the antenna may be disposed around the fluid inlet. The antenna may therefore be arranged so that in use fire suppression fluid travels through the antenna as it is dispensed from the sprinkler device. The provision of the antenna therefore may not interfere with the safety critical functionality of the sprinkler device in dispersing fire suppression fluid.

The antenna may be configured to use signals in the frequency range of 100 kHz to 160 kHz. The antenna may be configured to used signals with any suitable frequency, but may be configured to use short-range, low-frequency signals e.g. between 120 kHz to 150 kHz, or between 125 kHz to 148.5 kHz, or between 125 kHz to 134.2 kHz, or 140 kHz to 148.5 kHz. The wireless communication device may be configured similarly to the antenna. The sprinkler device and/or bulb device may therefore operate in a short-range, low frequency RFID band.

The sprinkler device may comprise a mounting adapter arranged to mount the sprinkler device to a surface. The sprinkler device may comprise a sprinkler body mounted to the surface by the mounting adapter. The sprinkler body may hold the bulb device and a seal for preventing dispersion of fire suppressant while the sprinkler bulb is intact. The sprinkler device may comprise a cage arranged to maintain the bulb device in place to hold the seal.

The sprinkler bulb of the bulb device may be arranged to prevent fire suppression fluid from being dispersed from the sprinkler device, and the sprinkler device may be arranged so that upon mechanical failure of the sprinkler bulb fire suppression fluid is released for suppression of a fire. In this regard the sprinkler bulb and sprinkler device may be arranged in a conventional manner and may be e.g. installed in a building, aircraft, vehicle, vessel, or other suitable structure where fire suppression capability may be needed. The fire suppression system may be installed in a building, aircraft, vehicle, vessel, or the like.

The sprinkler bulb may be arranged in the sprinkler device so that when it is intact it prevents release of fire suppression fluid from the sprinkler device, and when it breaks it causes the fire suppression fluid to be released from the sprinkler device. The sprinkler device may comprise a cage within which the bulb device is held in order to prevent release of fire suppression fluid while it is intact.

The system may comprise a plurality of sprinkler devices, each with an associated bulb device as recited herein with reference to the first aspect of the invention.

According to a third aspect of the invention there is provided a method of manufacturing a bulb device comprising affixing a wireless communication device to an external surface of a sprinkler bulb. The method may comprise manufacturing a bulb device as recited herein with reference to the first aspect of the invention.

According to a fourth aspect of the invention there is provided a method of manufacturing a bulb device comprising: manufacturing a first bulb device using the method as recited herein with reference to the third aspect of the invention; recovering the wireless communication device after breakage of the sprinkler bulb of the first bulb device; and affixing the wireless communication device to an external surface of a second sprinkler bulb.

Thus, the method may comprise re-using the wireless communication device. The method may comprise recovering the wireless communication device after a plurality of breakages of consecutive (different) sprinkler bulbs. The method may be a method of re-using the wireless communication device in a plurality of bulb devices.

The method may comprise propelling the wireless communication device away from the first bulb device by activation of the first bulb device prior to recovering the wireless communication device. The step of recovering the wireless communication device may comprise eliciting a wireless response from the wireless communication device to thereby locate it.

According to a fifth aspect of the invention there is provided a method of operating a fire suppression system, the method comprising providing a bulb device as recited herein with reference to the first aspect; positioning the bulb device in a sprinkler device; and propelling the wireless communication device away from the sprinkler device by activation of the sprinkler bulb of the bulb device.

The method may comprise propelling the wireless communication device more than 1 metre, more than 2 meters, more than 5 meters, and/or more than 10 metres. The method may therefore ensure that the wireless communication device is thrown far enough away from the sprinkler device that the sprinkler device will not detect it. Thus, the method may ensure that activation of a sprinkler bulb is reliably detected by increasing the likelihood that the wireless communication device is separated from the sprinkler device enough that the sprinkler device does not detect it (and thereby determines activation of the sprinkler bulb). The sprinkler device may comprise a wireless antenna operable to communicate with the wireless communication device during use. The sprinkler device may or may not be a sprinkler device as recited herein with reference to the second aspect of the invention.

BRIEF DESCRIPTION OF THE DRAWINGS

Certain preferred embodiments of the invention are describe by way of example only and with reference to the accompanying drawings, in which.

DETAILED DESCRIPTION OF THE INVENTION

Figure 1:
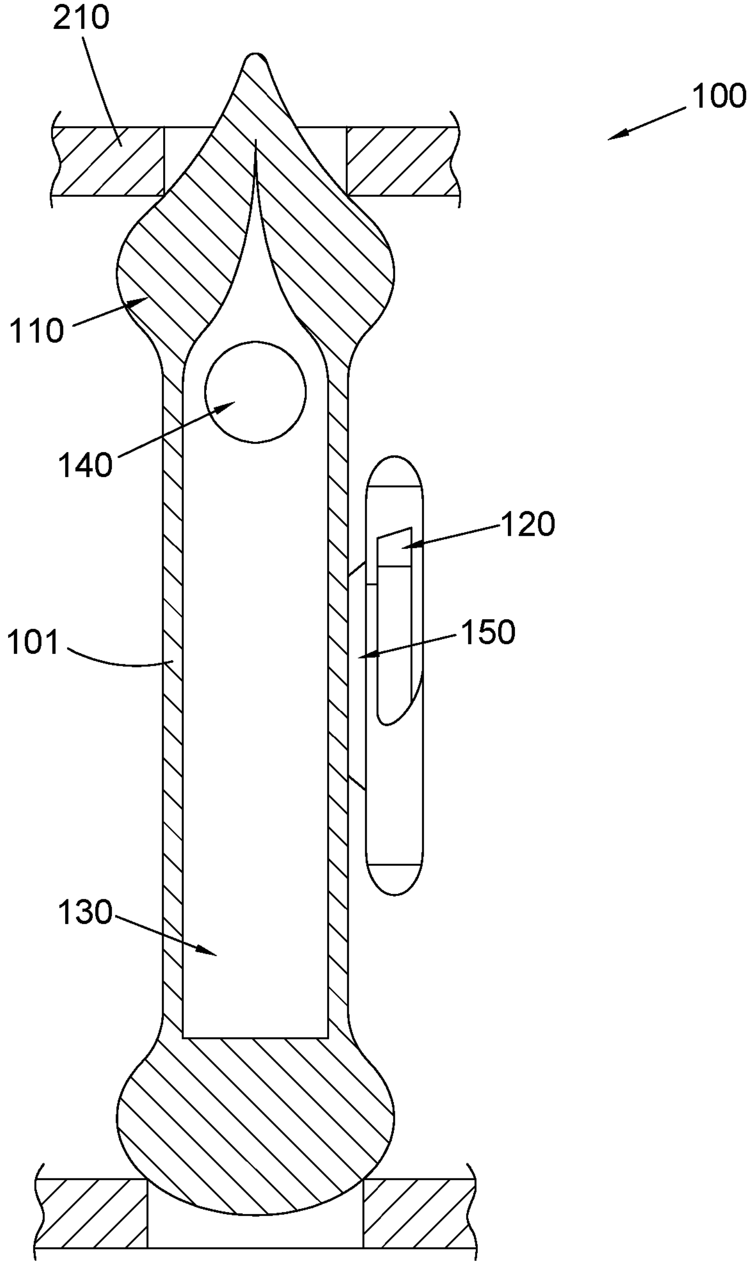
FIG. 1 shows a bulb device comprising a sprinkler bulb and a wireless communication device.

FIG. 1 shows a bulb device 100 comprising a sprinkler bulb 101 and a wireless communication device 120 coupled to the sprinkler bulb 101 by a coupling 150. The wireless communication device is a Radio Frequency Identification (RFID) tag 120. The sprinkler bulb 101 comprises a sealed frangible housing 110 containing a liquid 130 and a gas 140.

In use, the bulb device 100 is located in a sprinkler device 200 (see FIG. 2) of a fire suppression system (not shown), and is positioned to hold a seal 210, plug or the like in place to prevent fire suppression fluid from leaving the sprinkler device 200. The seal 210 of the sprinkler device 200 is partially shown in FIG. 1. The sprinkler bulb 101 is arranged so that it prevents deployment of fire suppressant fluid from the sprinkler device 200 unless it breaks. In the event of a fire near the sprinkler device 200, the liquid 130 in the housing 110 will be heated and therefore pressure within the housing 110 will increase. Once the liquid 130 reaches a predetermined temperature (e.g. indicative of being near a fire), the resulting pressure from the heated liquid 130 will break the frangible housing 110 and the seal 210 of the sprinkler device 200 will no longer be held in place. Fire suppression fluid will then be discharged from the sprinkler device 200. The housing 110, liquid 130, and gas bubble 140 can be configured so that the housing 110 will break under predetermined conditions e.g. when the liquid 130 reaches a predetermined temperature, and hence when the housing 110 is exposed to a predetermined pressure thereby. The housing 110 may be formed of any suitable material such as glass, plastic, crystal, ceramic, quartzoid, or the like. Quartzoid may be preferred for its prevalence in the field.

The RFID tag 120 is affixed to an external surface of the housing 110 of the sprinkler bulb 101 i.e. to an external surface of the sprinkler bulb 101. As such, the RFID tag 120 is not within the sprinkler bulb 101 e.g. either within the liquid 130 or the housing 110. The coupling 150 is disposed between the sprinkler bulb 101 and the wireless communication device 120.

Figure 2:
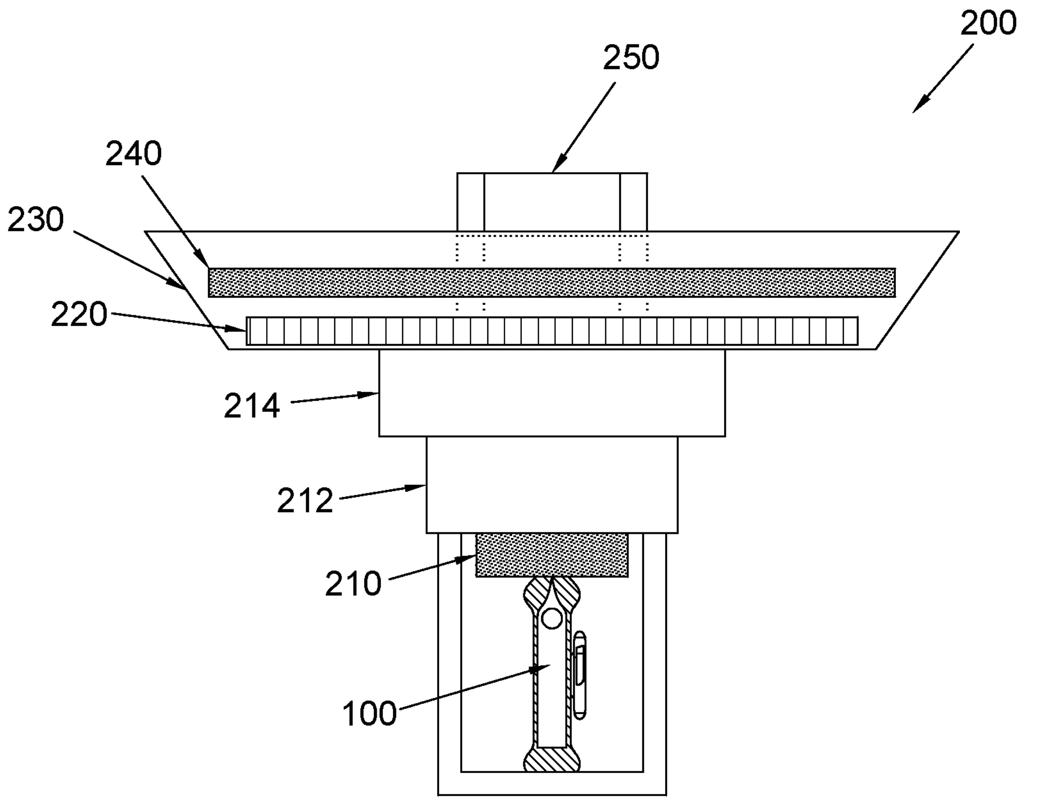
FIG. 2 shows a sprinkler device comprising the bulb device of FIG. 1.

FIG. 2 shows the sprinkler device 200 in more detail. The sprinkler device comprises the bulb device 100 arranged to maintain the seal 210 in a sealing position in a sprinkler body 212 while the sprinkler bulb 101 is intact. In the event of a fire near the sprinkler device 200, the fluid in the sprinkler bulb 101 is heated until pressure breaks the sprinkler bulb 100 and allows the seal 210 to move out of sealing engagement with the sprinkler body 212, thereby permitting fire suppression fluid (e.g. water) to be released from the sprinkler device 200 e.g. via a fluid inlet 250.

The sprinkler bulb 101 is held in the sprinkler device 200 by the sprinkler body 212. The sprinkler body 212 is mounted by a sprinkler mounting adapter 214 so as to receive fire suppression fluid from the fluid inlet 250. A base plate 230 is provided at the base of the sprinkler device 200, and a coil antenna 220 is located inside the base plate 230 together with a flux concentrator 240 adjacent the coil antenna 220. The base plate 230 extends radially outward from a central axis of the sprinkler device 200. The base plate 230 is wider than the sprinkler body 212 and/or the mounting adapter 214, and the coil antenna 220 is therefore also wider than the sprinkler body 212 and the mounting adapter 214.

The flux concentrator 240 is immediately adjacent coil antenna 220 and reflects flux from one side of the coil antenna 220, thereby concentrating flux at the bulb device 100. The flux concentrator 240 thereby prevents (or at least reduces) parasitic loss of the signal from the coil antenna 220 to components of the sprinkler device 200.

The RFID tag 120 is responsive to the flux from the coil antenna 220, so that the RFID tag 120 of the bulb device 100 emits a signal that is detected by the coil antenna 220. The coil antenna 220 and bulb device 100 therefore communicate during use. In particular, the coil antenna 220 is operable to detect the presence of the bulb device 100 (and hence of the sprinkler bulb 101), and may also detect other data e.g. an identification number or the like, depending on what sort of sprinkler bulb 101 is used.

The flux concentrator 240 also helps concentrate flux from the bulb device 100 (specifically from the RFID tag 120) at the coil antenna 220, and thereby improves communication between the coil antenna 220 and the bulb device 100. Since the bulb device 100 is relatively small and at least partially enclosed by the sprinkler body 212, the signal from the RFID tag 120 may be relatively weak and may not be detectable by the coil antenna 220 without provision of the flux concentrator 240.

The coil antenna 220 is disposed inside the base plate 230, and is disposed around the fluid inlet 250. The coil antenna 220 therefore does not interfere with the release of fire suppressant from the sprinkler device 200. The bulb device 100 is positioned coaxially with the coil antenna 220, and is thereby located at a position of relatively high signal strength from the coil antenna 220. The size and position of the coil antenna 220 therefore ensures reliable communication between the second antenna and the RFID tag 120.

The provision of the base plate 230 also allows the coil antenna 220 to be large enough, and close enough to the bulb device 100 to ensure reliable communication therebetween. The base plate 230 also protects the coil antenna 220 in the event of a fire, so that the coil antenna 220 does not need to be replaced in after a fire event. Instead, only the sprinkler bulb 100 may need to be replaced.

Figure 3:
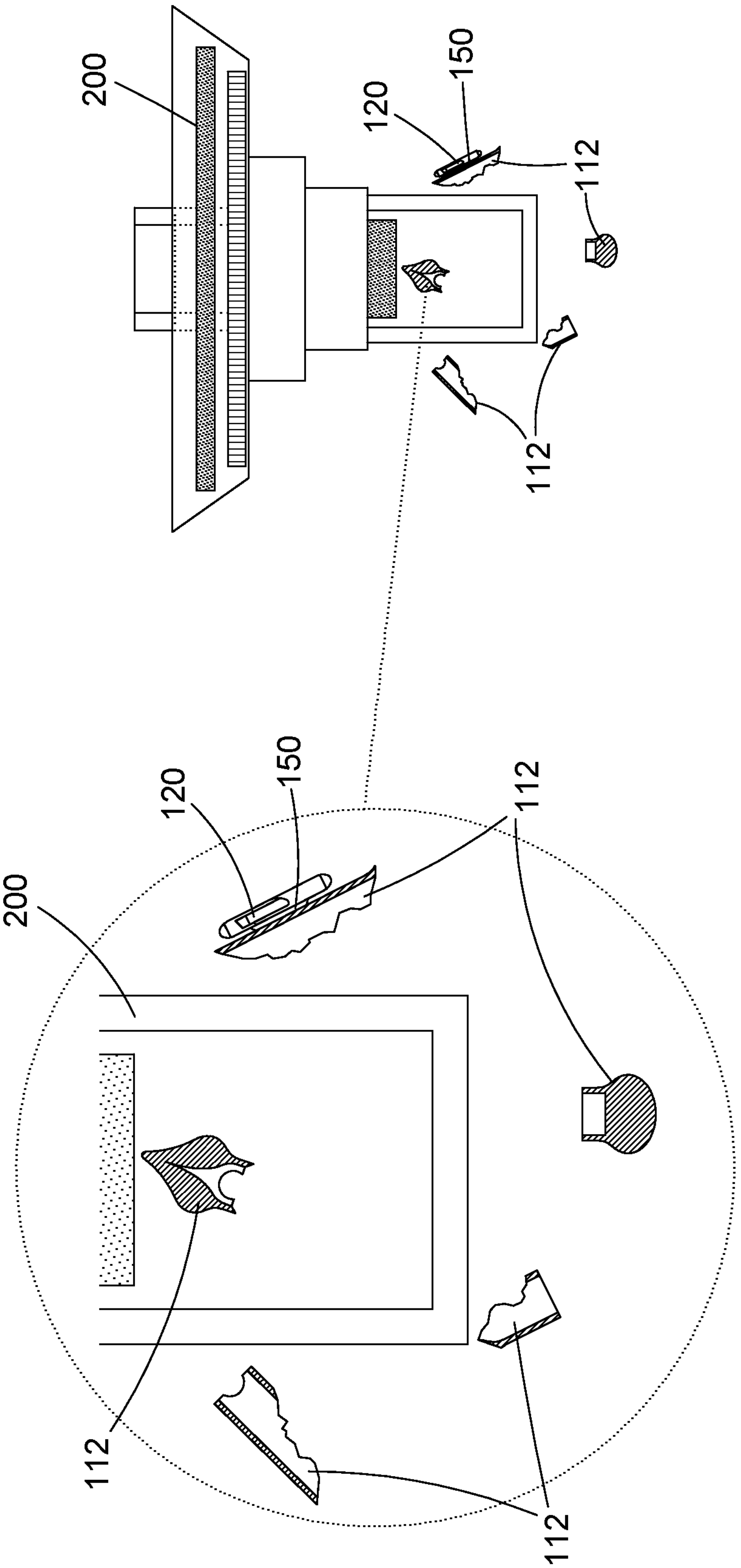
FIG. 3 shows the activation of the bulb device schematically.

FIG. 3 shows a schematic of the sprinkler device 200 during a detection event when the sprinkler bulb 101 bursts or explodes. A magnification of the bursting sprinkler bulb 101 is also shown, in which fragments 112 of the sprinkler bulb 101 are shown. As can be seen from FIG. 3, the coupling 150 of the bulb device 100 has prevented the portion of the housing 110 near the RFID tag 120 from breaking. Further, the coupling 150 protects the RFID tag 120 (or any suitable wireless communication device) from damage during explosion of the sprinkler bulb 101. In practice, the activation of the sprinkler bulb 101 can be relatively high energy, and is essentially an explosion, as high pressure within the sprinkler bulb 101 is explosively released by the housing 110 shattering. The fragments 112 can therefore be launched outwards with significant force. The coupling 150 therefore prevents fragments 112 impacting the RFID tag 120 and thereby causing damage to it. The coupling 150 is therefore a shield protecting the RFID tag 120 from fragments 112 of the sprinkler bulb 101.

Moreover, the RFID tag 120 is external to the sprinkler bulb 101 and therefore is not exposed to the high pressures within the housing 110 necessary to cause the bulb 101 to shatter. Thus, the RFID tag 120 is protected from the sprinkler bulb 101 activation and can be recovered and re-used e.g. affixed to another sprinkler bulb 101. Since the RFID tag 120 is not damaged by the activation of the sprinkler bulb 101, it may continue to operate and may be located by scanning for a signal from it.

The coupling 150 also increases integrity of the portion of the sprinkler bulb 101 adjacent the RFID tag 120 i.e. the fragment 112 carrying the RFID tag 120. As a result, instead of fragmenting further, the fragment 112 of the sprinkler bulb 101 is held together and energy from activation and explosion of the sprinkler bulb 101 goes to propelling the fragment 112 and RFID tag 120 outwards. The RFID tag 120 is therefore launched away from the sprinkler device 200 by activation of the sprinkler bulb 101, carried by the coupling 150. Thus, the coupling 150 acts as a vehicle for the RFID tag 120 upon activation of the sprinkler bulb 101 and enables the RFID tag 120 to be propelled away from the sprinkler device 200 (and the location of the sprinkler bulb 101 at activation). Consequently, the sprinkler device 200 is less likely to detect the RFID tag 120, and thus activation of the bulb device 100 and sprinkler bulb 101 is more likely to be detected. The location of the wireless communication device 120 outside the sprinkler bulb 101 with the coupling 150 disposed between the wireless communication device 120 and the sprinkler bulb 101 may therefore increase the reliability with which activation of the sprinkler bulb 101 is detected.

What is claimed is:

1. A sprinkler device for a fire suppression system, the sprinkler device comprising:

a bulb device (100) comprising:

a sprinkler bulb (101);

a wireless communication device (120); and a coupling (150) affixing the wireless communication device (120) to an external surface of the sprinkler bulb (101);

wherein the wireless communication device comprises an RFID tag;

wherein the coupling (150) is disposed between the wireless communication device (120) and the sprinkler bulb (101);

an antenna (220) for communicating with the wireless communication device (120) of the bulb device (100); and a base plate (230), wherein the antenna (220) is disposed within the base plate (230).

2. A sprinkler device as claimed in claim 1, wherein the coupling (150) reinforces the sprinkler bulb (101) adjacent the wireless communication device (120).

3. A sprinkler device as claimed in claim 1, wherein the sprinkler bulb (101) only contains fluid (130).

4. A sprinkler device as claimed in claim 1, wherein the wireless communication device (120) is a passive wireless communication device.

5. A sprinkler device as claimed in claim 1, wherein the bulb device (100) is arranged to propel the wireless communication device (120) away from the sprinkler bulb (101) upon activation of the sprinkler bulb (101).

6. A sprinkler device as claimed in claim 1, wherein the coupling (150) is configured to protect the wireless communication device (120) from the sprinkler bulb (101) during activation.

7. A sprinkler device as claimed in claim 1, wherein the antenna (220) is a coil antenna.

8. A sprinkler device as claimed in claim 1, wherein the sprinkler bulb (101) of the bulb device (100) is coaxial with the antenna (220).

9. A sprinkler device as claimed in claim 1, wherein the base plate (230) is formed of metal, heat resistant polymer, glass, and/or composite.

10. A sprinkler device as claimed in claim 1, comprising a flux concentrator (240) arranged to concentrate flux from the antenna (220) at the bulb device (100).

11. A sprinkler device as claimed in claim 1, wherein the antenna (220) is configured to use signals in the frequency range of 100 kHz to 160 kHz.

12. A method of operating a fire suppression system, the method comprising providing a sprinkler device as claimed in claim 1; positioning the bulb device (100) in the sprinkler device (200); and propelling the wireless communication device (120) away from the sprinkler device (200) by activation of the sprinkler bulb (101) of the bulb device (100).

* * * * *